United States Patent
Cohen et al.

(10) Patent No.: US 7,502,971 B2
(45) Date of Patent: Mar. 10, 2009

(54) DETERMINING A RECURRENT PROBLEM OF A COMPUTER RESOURCE USING SIGNATURES

(75) Inventors: Ira Cohen, Sunnyvale, CA (US); Moises Goldszmidt, Moss Beach, CA (US); Julie A. Symons, Santa Clara, CA (US); Terence P. Kelly, Palo Alto, CA (US); Steve Y. Zhang, Camas, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 493 days.

(21) Appl. No.: 11/248,692

(22) Filed: Oct. 12, 2005

(65) Prior Publication Data

US 2007/0083513 A1    Apr. 12, 2007

(51) Int. Cl.
    *G06F 11/00* (2006.01)
(52) U.S. Cl. .................................. 714/45; 702/186
(58) Field of Classification Search .................. 714/45; 702/185, 186
    See application file for complete search history.

(56) References Cited

U.S. PATENT DOCUMENTS

| | | | | |
|---|---|---|---|---|
| 5,157,782 | A * | 10/1992 | Tuttle et al. | 714/45 |
| 6,457,145 | B1 * | 9/2002 | Holmberg et al. | 714/45 |
| 6,792,393 | B1 * | 9/2004 | Farel et al. | 702/186 |
| 7,171,337 | B2 * | 1/2007 | Yuan et al. | 702/185 |
| 2005/0015624 | A1 * | 1/2005 | Ginter et al. | 713/201 |
| 2007/0294591 | A1 * | 12/2007 | Usynin et al. | 714/45 |

OTHER PUBLICATIONS

Aguilera, M. et al., "Performance Debugging for Distributed Systems of Black Boxes", Oct. 20, 2003.
Barham, P. et al., "Using Magpie for Request Extraction and Workload Modelling", USENIX OSDI '04 Symposium on Operating Systems Design and Implementation, 2004.
Bodik, P. et al., "Combining Visualization and Statistical Analysis to Improve Operator Confidence and Efficiency for Failure Detection and Location", downloaded Oct. 12, 2005.
Candea, G. et al., "Microreboot-A Technique for Cheap Recovery", Proc. of the 6th Symposium on Operating Systems Design and Implementation, Dec. 2004.
Chen, M. et al., "Pinpoint: Problem Determination in Large, Dynamic Internet Services", downloaded Oct. 12, 2005.
Cohen, I. et al., "Correlating Instrumentation Data to System States: A Building Block for Automated Diagnosis and Control", downloaded Oct. 12, 2005.
Jacobs, D., "Distributed Computing with BEA WebLogic Server", Proceedings of the 2003 CIDR Conference, 2003.
Kephart, J. et al., "Automatic Extraction of Computer Virus Signatures", Proc. of the 4th Virus Bulletin Internation Conference, England, 1994, p. 179-194.

(Continued)

*Primary Examiner*—Robert Beausoliel
*Assistant Examiner*—Philip Guyton

(57) ABSTRACT

A computer system includes a signature creation engine operable to determine signatures representing states of a computer resource from metrics for the computer resource. The computer system also includes a database operable to store the signatures along with an annotation for each signature including information relating to a state of the computer resource. The computer system is operable to determine a recurrent problem of the computer resource from stored signatures.

37 Claims, 7 Drawing Sheets

OTHER PUBLICATIONS

Kiciman, E. et al., "Detecting Application-Level Failures in Component-Based Internet Services", downloaded Oct. 12, 2005.

Mosberger, D. et al., "httperf—A Tool for Measuring Web Server Performance", HPL-98-61, Hewlett-Packard Company, 1998.

Pai, V. et al., "IO-Lite: A Unified I/O Buffering and Caching System", ACM Transaction on Computer Systems, vol. 18, No. 1, Feb. 2000, p. 37-66.

Redstone, J. et al., "Using Computers to Diagnose Computer Problems", USENIX, Proc. of HotOS IX, May 2003.

Steinder, M. et al., "A Survey of Fault Localization Techniques in Computer Networks", Science of Computer Programming, Jul. 2004, p. 165-194.

System Management Arts ( SMARTS) Inc., http://www.smarts.com, downloaded Oct. 12, 2005.

The Open Group, "Systems Managment: Application Response Measurement", Jul. 1998.

Welsh, M. et al., "SEDA: An Architecture for Well-Conditioned, Scalable Internet Services", Proc. of the 18th Symposium on Operating Systems Principles, Oct. 2001.

Yemini, S. et al., "High Speed & Robust Event Correlation", downloaded Oct. 12, 2005.

Zhang, S. et al., "Ensembles of Models for Automated Diagnosis of System Performance Problems", HP Laboratories, Palo Alto, Jan. 2005, Internal Acessssion Date Only.

Mukherjee, B. et al., "Network Intrusion Detection", IEEE Network, May/Jun. 1994, p. 26-41.

\* cited by examiner

DETERMINING A RECURRENT PROBLEM OF A COMPUTER RESOURCE USING SIGNATURES

BACKGROUND

Computer systems in use today may be very complex and are typically monitored using a large number of measurable metrics. If a computer system is not functioning as expected, an administrator may be called in to diagnose and solve the problem. A variety of problems can be solved by simple techniques, such as rebooting, but many cannot. Understanding and documenting the likely causes of such problems is difficult, because they often emerge from the behavior of a collection of many metrics, such as CPU load, disk I/O rates, etc. Therefore, simple "rules of thumb" focusing on a single metric are usually misleading. Today, there is no systematic and automated way to leverage past diagnostic efforts when a problem arises, even though such efforts may be lucrative for maintaining a computer system.

SUMMARY

According to an embodiment, A computer system includes a signature creation engine operable to determine signatures representing states of a computer resource from metrics for the computer resource. The computer system also includes a database operable to store the signatures along with an annotation for each signature including information relating to a state of the computer resource. The computer system is operable to determine a recurrent problem of the computer resource from stored signatures.

BRIEF DESCRIPTION OF THE DRAWINGS

The embodiments are illustrated by way of example and without limitation in the accompanying figures in which like numeral references refer to like elements, and wherein.

DETAILED DESCRIPTION

Figure 1:
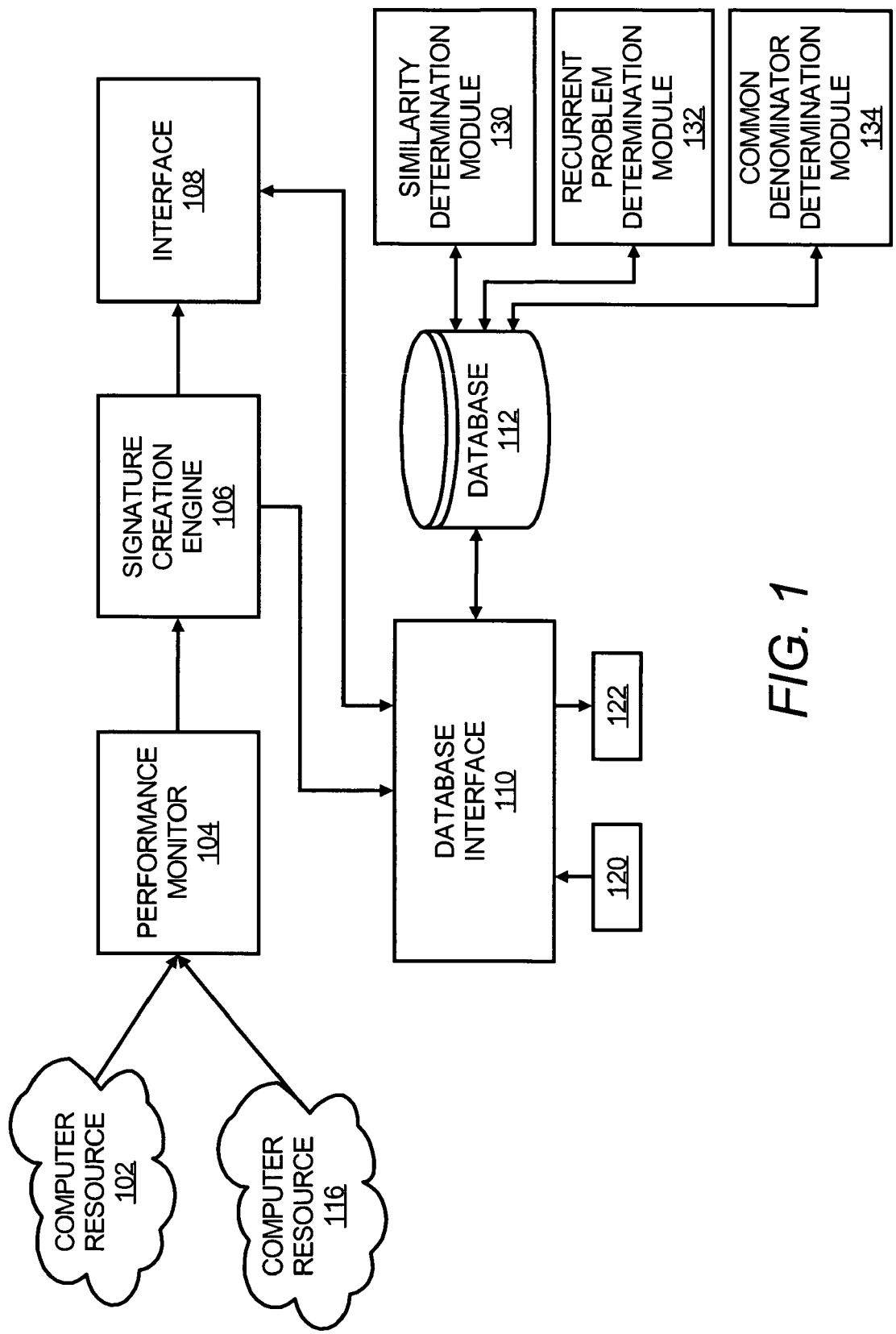
FIG. 1 shows a block diagram of a system for creating a signature database, according to an embodiment.

For simplicity and illustrative purposes, the principles are shown by way of examples of systems and methods described. In the following description, numerous specific details are set forth in order to provide a thorough understanding of the examples. It will be apparent however, to one of ordinary skill in the art, that the examples may be practiced without limitation to these specific details. In other instances, well known methods and structures are not described in detail so as not to unnecessarily obscure understanding of the examples.

According to an embodiment, a system collects metrics of a computer resource. A computer resource is any resource within a computing environment. A computer resource may include hardware, such as one or more hardware components. Examples of hardware components include processors, volatile and non-volatile memory, and hard disks. A computer resource may include software components, such as one or more of applications, databases, operating systems, and networking software. A computer resource may include a combination of hardware and software components. A computer resource may include a computer system or a group of computer systems, such as a server, a server group, or a router. Another example of a computer resource is an Internet service, such as an external- request-driven, interactive application based on a standard three-tier architecture of a stateless Web server, a tier containing application logic possibly running on top of a middleware platform, and a persistence tier containing one or more databases. The metrics are any measurable features of the computer resource. For instance, server response time or pages served per time period are examples of metrics. Other examples include CPU utilization, memory utilization, disk utilization and bandwidth. These features, for example, are related to the measured performance of the computer resource.

The system collects metrics of the computer resource and converts the metrics into a signature representing a state of the computer resource. A signature is a representation of a state of the computer resource. The signature is annotated with information describing the state of the computer resource, referred to as the annotation. The information may be associated with a problem of the computer resource. A problem may include a performance problem, a fault of the computer resource or a failure of the computer resource and the signature is identified when the computer resource is having the problem. The annotation may include one or more of a description of the problem, a diagnosis of the problem and a solution to the problem. Other information may also be included in the annotation, such as a label, configuration of a system, identification of system administrator and other similar information. Signatures and annotations may be determined for a computer resource even when the computer resource does not have a problem and may be used for capacity planning and describing normalcy states of the computer resource, such as when the computer resource is operating within predetermined parameters.

One or more of the predetermined parameters, for example, are determined from service level objectives (SLOs) or service level agreements (SLAs). For example, the annotation may describe a state where the computer resource is load-balanced. SLOs are parameters that should be met by a service, which may include one or more applications. For example, the parameters may include service metrics that are measured and compared to the parameters specified in the SLOs. An example of an SLO is average response time of requests to a service being less than 5 seconds. The response time is measured and compared to the 5-second threshold to determine whether there is a violation. SLOs may be specified in SLAs. In another example, the computer resource's operational policy defines one or more reference metrics, such as average response time, request throughput, and others, and a threshold on each of these metrics or a threshold over a collection of metrics. These reference metrics and the thresholds define a SLO. The computer resource is in violation of an SLO, for example, if a reference metric exceeds a corresponding threshold, and computer resource is in compliance with its SLO otherwise. The SLO may be defined as an aggregate, for example, "at least 60% of requests during a 5-minute interval have a response time less than T." Determining compliance or violations of an SLO is performed, for example, to understand the underlying causes of high-level system behavior and how these causes manifest as an SLO violation or compliance. These determinations may then be evaluated to identify, prioritize and fix recurrent performance issues.

Signatures may be periodically determined, such as for each time interval when metrics are collected. According to an embodiment, the signatures and corresponding annotations are stored in a database such that the signatures and corresponding annotations are searchable. A user may use the database to search for signatures. In one example, a user may search for signatures to diagnose and fix problems associated with another computer resource. This may be accomplished by collecting metrics of the computer resource with the problem and converting the metrics into a signature. This signature, referred to as the search signature, is used to search the database to identify a signature which is closely matches the search signature. The user may then retrieve the annotation associated with the known signature to possibly determine a diagnosis and solution to the problem. This method significantly reduces the time and effort usually needed to diagnosis computer related problems. This is especially true in large complex computer systems where the number of metrics to consider may be very large.

According to an embodiment, the signatures and annotations are stored and indexed, for example, in a database such that similarity-based searches may be performed on the stored signatures. An operator may search the database of indexed signatures to find past occurrences of similar problems, and thus the searchable, indexed signatures allow the operator to leverage past diagnostic and repair efforts to solve current problems.

According to an embodiment, the stored signatures are grouped for identifying recurrent problems and for identifying collections of metrics that can represent a syndrome of a problem. For example, the database of signatures is clustered to find clusters of signatures that characterize different performance problems and normal operation regimes. A syndrome of a problem, which may be a recurrent problem, is determined from a common denominator characterizing signatures in a group, such as signatures in a cluster. In one embodiment, the common denominator is determined from a cluster centroid. In another embodiment, the common denominator is determined from a most frequently occurring substring or a largest, most frequently occurring substring in a group, for example, when a signature is represented as a string. Other techniques may be used for determining the common denominator. The syndrome may be a signature or a substring and possibly an annotation that highlights the metrics that are characteristic of a set of manifestations of the same problem.

Also, in one embodiment, grouping similar signatures is used to identify recurrent problems and to gather statistics regarding their frequency and periodicity. Based on the frequency of each problem, problems may be prioritized. For example, a recurrent problem may be given a higher priority than a problem occurring only one time or only sporadically over a period time. Problem-solving resources may be allocated to higher-priority problems first.

With reference first to FIG. 1, there is shown a block diagram of a system 100 for creating a signature database, according to an embodiment. The system 100 includes a computer resource 102, a performance monitor 104, a signature creation engine 106, an interface 108, a database interface 110, and a database 112.

In one example, the performance monitor 104 measures metrics associated with the computer resource 102. The metrics may be measured over time periods. For instance, the performance monitor 104 may measure a group of metrics over 5 minute intervals. This time period is adjustable depending on the nature and use of the computer resource 102. For instance, if the computer resource 102 is used in a less predictable interactive environment, such as a web server responding to customer requests, a small measurement interval may be chosen to meaningful measure data spikes throughout the day. On the other hand, if the computer resource 102 is used in a controlled and more predictable environment, such as computer resource running a batch job, a longer measurement interval may be chosen to reduce the amount of measurements required by the performance monitor 104. In one example, measurements for a metric taken during a measurement interval may be averaged and used as the value for the metric for that time interval.

The metrics collected by the performance monitor 104 are sent to the signature creation engine 106. The signature creation engine 106 uses the metrics to generate signatures. A signature is a representation of a state of a computer resource.

In one embodiment, the signature creation engine 106 uses raw values for each metric to create signatures. Raw values are the measurements for each metric or values determined from the measurements of each metric. For example, a measured CPU utilization for a time interval is 80%, which is a measurement of a metric. In another example, the raw value is a mean of a plurality of measurements. A signature may be provided for each time interval. For example, the signature may be represented as $S_T=[M_1, M_2, M_3, \ldots M_n]$ where $M_1, \ldots M_n$ are raw values of the measured metrics and $S_T$ is a signature for the time interval T.

In another embodiment, the signature creation engine 106 creates signatures using metric attribution to generate an attribute vector. An example of determining an attribute vector using metric attribution is described in U.S. patent application Ser. No. 10/987,611, entitled "Automated Diagnosis and Forecasting of Service Level Objective States", by Goldszmidt et al., which is assigned to the same assignee of the present application and is hereby incorporated by reference in its entirety.

In one example of metric attribution, an attribute vector is generated for a state of a computer resource indicative of a violation or compliance of a SLO. An SLO can be any objective for computer resource performance. It will be apparent to one of ordinary skill in the art that the attribute vector may be generated for any state and not necessarily a state representing a violation of an SLO.

The signature creation engine 106 determines models representative of system states in accordance with SLO definitions. SLO models are determined for each possible state of the computer resource. An SLO model may be a classifier representing a probability distribution. Compliance with an SLO is determined by comparing metrics collected by the performance monitor 104 to the SLO models. Some of those SLO models may represent a state indicative of a violation of the SLO. If the collected metrics closely fit a model indicative of a violation, then a performance problem is determined.

The signature creation engine 106 generates a model including a representation for each possible state of the computer resource for each SLO. The signature creation engine 106 also identifies key metrics within each model that are alone or in combination indicative of the SLO state the model represents. Key metrics are metrics within a model that are most indicative of the SLO state of the model. In one example, the key metrics are identified by computing a relevance score for each metric in a model and then ordering the metrics according to relevance in decreasing order. In one embodiment, the relevance score is a probability that a group of metrics are indicative the SLO state for the model. In some instances, the relevance score of a single metric or a group of metrics is also a probability that the metric or group of metrics indicate a root cause of a negative SLO state. The metrics having a high probability, such as a probability greater than a threshold, may be selected as the key metrics. Both the key metrics and the models may be determined using a probability distribution. In one embodiment, known classifier algorithms, such as Bayesian classifiers, may be used for generating the models.

A more detailed description of an embodiment of the metric attribution process is as follows. The input of the process, for example, is the raw value vectors for each time period, such as a data log containing raw values for metrics in each time period and the state Y, such as compliance or violation, of the computer resource. Y contains a discrete value depending on whether the SLO was violated or not for each time period. The data log may be generated by raw values determined by the performance monitor 104.

Probabilistic models characterizing the behavior of the metrics during intervals of both compliance and violation are generated, for example, by the signature creation engine 106. Each one of the models represents the relationship between the metrics and the SLO state as a joint probability distribution. In one example, Tree-Augmented Naive Bayes models (TAN), which are known in the art, are used to represent the joint probability distribution.

From the probability distribution, a characterization of each metric and its contribution to the SLO state is determined. For example, the term $P(m_i|m_{pi}, S^-)$ resulting probabilistic model for metric $m_i$ under violations ($s^-$), and term $P(m_i|m_{pi}, S^+)$ represents the probabilistic model for the same metric under an SLO state of compliance. The term $m_{pi}$ represents a metric directly correlated with metric mi in the Bayesian network representation.

Using these models, for each time period, the signature creation engine 106 identifies metrics that are more likely to come from their characteristic distribution during violation. For example, metrics having raw values having a probability greater than a threshold in the probability distribution provided by a model for the time period are identified as key metrics. This process is called metric attribution. For example, for a given time period, a metric is flagged as "attributable" to a violation and is a key metric if log $P(m_i|m_{pi}, S^-) > $ log $P(m_i|m_{pi}, S^+)$.

Similarly, key metrics may be determined from the models that are indicative of compliance of an SLO. For example, for a given time period, a metric is flagged as not attributable to a violation and is a key metric if log $P(m_i|m_{pi}, S^+) > $ log $P(m_i|m_{pi}, S^-)$ by a predetermined amount. These key metrics may be indicative of compliance with an SLO.

Some metrics are determined not to be indicative of a violation or compliance, and these metrics are not key metrics and are referred to as irrelevant.

The signature creation engine 106 determines an attribute vector for each time interval. The attribute vector includes an entry for each metric. For example, an entry $s_i=1$ is assigned to a metric if that metric is determined to be a key metric whose raw value is determined to be indicative of a violation based on one or more of the models for that time interval. That metric is referred to as attributed.

An entry $s_i=-1$ is assigned to a metric if that metric is determined to be a key metric whose raw value is not determined to be indicative of a violation based on one or more of the models for that time interval. That metric is referred to as not attributed.

An entry $s_i=0$ is assigned to a metric if that metric is determined not to be indicative of any state of the computer resource, such as not being indicative of compliance or violation of an SLO, based on the models for that time interval. That metric is referred to as irrelevant to the SLO state.

The signature creation engine 106 determines attribute vector signatures for each time interval including values of 0, 1 of −1 for each metric. These signatures are useful both for characterization of the behavior of a computer resource in compliance periods and in violation periods. Thus, given traces collected on a computer resource, signatures may be generated and stored in the database 112 describing computer resource state coupled with the SLO state.

Another type of signature that may be generated by the signature creation engine 106 includes the AND of raw values and metric attribution. For example, the raw value of a metric is multiplied by the metric attribution value for the metric.

Table 1 shows examples of three types of signatures, each including a vector of values.

TABLE 1

| Metric Name | Raw Value | Metric Attribution | Raw Value AND Metric Attribution |
|---|---|---|---|
| transaction count | 398.00 | 0 | 0 |
| gbl app cpu util | 97.47 | 1 | 97.47 |
| gbl app alive proc | 449.00 | 0 | 0 |
| gbl app active proc | 359.00 | 0 | 0 |
| gbl app run queue | 10.57 | 1 | 10.57 |
| gbl app net in packet rate | 817.00 | 1 | 817.00 |
| gbl mem util | 54.62 | 1 | 54.62 |
| gbl mem user util | 26.32 | 1 | 26.32 |
| dbl cpu util | 25.96 | −1 | −25.96 |

Table 1 lists values for three types of signatures, one or more of which may be generated by the signature creation engine 106 and stored in the database 112. For example, some of the metrics collected by the performance monitor 104 are listed in column 1. The raw value column lists the raw values for each metric for a raw value signature. The metric attribution column lists values for metric attribution signature. The raw value AND metric attribution column lists values for a raw value AND metric attribution signature. Signatures may be generated for each time interval.

Once a signature is created by the signature creation engine 106, an annotation may be provided by a user through the interface 108. In another example, an automated system may be used to generate the annotation. The interface 108 may be a data entry system allowing a user, such as an administrator or other user, to annotate the signature. The interface 108 is optional, for example, if another interface is available for entering an annotation, such as via the database interface 110.

If the signature represents a state of a computer resource indicative of a problem, such as a performance problem, fault or failure, or a violation of an SLO, the annotation may include a description of the problem and a diagnosis of the problem. Additionally, the user may annotate the signature with a solution to the problem. Annotations may be determined for a computer resource even when the computer resource does not have a problem and may be used for capacity planning and describing normalcy states of the computer resource, such as when the computer resource is operating within predetermined parameters. One or more of the predetermined parameters, for example, are determined from service level objectives (SLOs) or service level agreements (SLAs). For example, the annotation may describe a state where the computer resource is load-balanced. Generally, an annotation may be provided for any signature, regardless of whether the state is indicative of a computer resource operating in a positive or negative manner. This information is input to the database interface 110 and then stored in the database 112.

The database interface 110 is operable to store and retrieve information in the database and search the database. FIG. 1 illustrates inputting a query 120 into the database 112 via the database interface 110 and receiving search results 122 for the query 120. The search results 122 may include signatures from the database 112 that match or closely match the search 120 and the corresponding annotations. For example, an administrator is having problems with a computer resource. The administrator determines a signature representing the state of the computer resource indicative of the problem and generates the query 120 including the signature. The determined signature may be generated by the signature creation engine 106. The search results 122 may include signatures closely matching the signature in the query 120 and corresponding annotations. These annotations may indicate solutions or diagnosis of the problem. In another example, the administrator is deigning a system and searches for signatures representing positive performance, such as a load-balanced state. The query 120 is not required to include a signature and, for example, may include a text search for annotations meeting the query. When a signature is used in the query 120, the signature is of the same type of signatures stored in the database so the signatures can be compared to identify close matches. Examples of types of signatures may include raw value vectors or attribute vectors described below.

As described above, the database interface 110 is operable to retrieve signatures and corresponding annotations. For example, the query 120 includes a signature, referred to as a search signature. The database interface 110 is operable to identify at least one signature closely matching the search signature. A closely matching signature may include an exact match or a signature determined to be similar to the search signature. Known algorithms may be used to identify signatures similar to the search signature. For example, a Hamming distance may be used to identify and specify the degree of similarity. For example, signatures within 2 Hamming distances from the search signature may be retrieved along with corresponding annotations. Also, a distance metric used for clustering, such as L1 and L2 norms, may be used for selecting closely matching signatures or signatures that are similar.

In one embodiment, the database interface 110 is operable to provide precision and recall for searching the database 110. For example, user feedback is used to tag retrieved signatures in the search results 122 that are considered relevant. This process may be repeated for several searches and the results may be prioritized or a subset of the results may be selected based on metrics that are used to identify the most relevant search results and the user feedback.

The number of signatures gathered and stored in the database 112 may be rather large. In addition, a rather large number of signatures may represent the same problem. As such, the signatures and corresponding annotations may be organized to optimize searches, such as through clustering.

According to an embodiment, the system 100 also includes a similarity determination module 130, a recurrent problem determination module 132 and a common denominator determination module 134. The similarity determination module 130 is operable to determine signatures that are similar and group signatures that are similar using, for example, a pattern matching technique to find groups of signatures that characterize different problems or normal operation regimes. The recurrent problem determination module 132 is operable to identify a recurrent problem based on whether signatures from the same group occur during a recurring problem. The common denominator determination module 134 is operable to determine a common denominator for signatures in a group that characterizes a problem.

According to an embodiment, the similarity determination module 130 determines signatures that are similar and groups signatures that are similar using a clustering algorithm. The similarity determination module 130 determines clusters for signatures stored in the database 112, for example, to find groups of signatures that characterize different problems or normal operation regimes. For example, the similarity determination module 130 applies a clustering algorithm to determine a set of clusters.

Ideally, each cluster should contain signatures belonging to a single class of problems, such as SLO violations, or else signatures belonging only to periods of SLO compliance. However, in many instances clusters may include signatures diverging from a state represented by the majority of signatures in the class. According to an embodiment, the similarity determination module 130 may also determine a purity for each cluster. The purity is a metric indicating whether the signatures in a cluster represent symptoms of a characterization of the same problem, or same normal operation regime. The purity may be used as a measure of how accurate a cluster is or how well a cluster represents a particular problem or normal operation regime. The purity may be used for comparing clusters and may be used as a stopping criteria for the clustering algorithm.

In one embodiment, the purity of a cluster is based on the similarities between the labels for signatures in the cluster. Labels are assigned to signatures in a cluster and are used to determine the purity of the cluster. For example, the purity is based on how many signatures in a cluster are representative of the same state of a computer resource, such as how many signatures represent a single class of problems, such as an SLO violation, or how many signatures in the cluster are representative of SLO compliance. A label is assigned to each signature in the cluster as "compliant" or "violation". For example, compliance may be based on one or a group of metrics from a signature are used to determine a value for the SLO, and the value is compared to a threshold to determine compliance or violation. There may be more than two labels that can be assigned in a cluster, and labeling may be performed by an administrator or may be automated. Also, based on a prior determination, signatures may be labeled as compliant or a violation of an SLO, for example, based on an analysis of values in the signature and whether an SLO was violated when the raw values for the signature were measured.

Counts may be performed to determine the number of signatures having the same label in each cluster. For example, the number of signatures in each cluster that describe epochs or time periods of compliance and the number of signatures that describe epochs of violations are determined and the purity of the cluster may be based on this determination.

Entropy is one measure of purity. For example, counts for compliance and violation are determined. In another example, signatures having the same annotations are counted in the same group, such as a group including the compliance count or a group including the violation count. These counts are then normalized by the total number of signatures in the cluster, such as the sum of the two, to produce probability estimates for compliance, $p_c$, or for violations $p_v$. For example, $p_c+p_v=1$. A cluster is pure, for example, if it contains signatures of only compliance or only violation epochs, i.e., if either $p_c$ or $p_v$ are 1. With these probabilities, the entropy of each cluster, given as $-p_c \log_2(p_c)-p_v \log_2(p_v)$ is computed. For a pure cluster, entropy is 0, which is the best result. The entropy is 1 when the cluster is evenly split between the two types of signatures, such as $p_c=p_v=0.5$.

The overall average entropy of all the clusters weighted by the normalized cluster size may be determined to provide a measure of purity of the cluster. Average entropy close to 0 is a strong indication that the signatures in a cluster captured meaningful characteristics of the periods of violations in contrast to periods of non-violation.

Table 2 below provides examples of clustering instances based on metric attribution.

TABLE 2

| Cluster # | # vio | # compl | Entropy |
|---|---|---|---|
| 1 | 552 | 27 | 0.27 |
| 2 | 225 | 0 | 0.00 |
| 3 | 265 | 2 | 0.06 |
| 4 | 0 | 1304 | 0.00 |
| 5 | 1 | 1557 | 0.00 |
| 6 | 0 | 1555 | 0.00 |
| 7 | 0 | 1302 | 0.00 |
| 8 | 216 | 274 | 0.99 |
| 9 | 100 | 128 | 0.99 |

The first column is the number of violation instances, the second column is the number of compliance instances, and the third column shows the cluster entropy based on the purity of the cluster. Clusters with a number of violations and compliances that are equal or are nearly equal have entropies closer to 1, such as clusters 8 and 9. Clusters with substantially all violations or all compliances have entropies closer to 0, such as clusters 1-7.

The violation and compliance counts in a cluster along with a corresponding entropy for each cluster may be stored in the database 112. The number of violations and compliances may be useful to an administrator for providing a sense of the intensity of the pure clusters, giving the capability to focus attention on the more prominent clusters of performance problem instances. However, storing these counts is optional.

Clusters are one example of groups of similar signatures that may be determined by the similarity determination module 130. Pattern matching techniques, other than clustering algorithms, may be used to determine similar signatures.

The common denominator determination module 134 determines a common denominator that characterizes a group of similar signatures determined, for example, by the similarity determination module 130. A group of signatures may be representative of a problem, such as an SLO violation, or a normal operating regime, such as compliance of an SLO for a period of time. Thus, the common denominator may be a syndrome of a problem, such as an SLO violation, or a characterization of a normal operating period.

In one embodiment, a cluster centroid is used to determine the common denominator. A cluster centroid of a cluster of signatures determined to be representative of a problem can be used as a syndrome for the problem, since it highlights the metrics that are characteristic of a set of manifestations of the same problem. A cluster centroid is the point to which the sum of distances from all objects in that cluster is minimized. A syndrome of a problem may be determined by identifying all the signatures closest to the centroid and determining metrics for those signatures that are representative of a problem. Those metrics are used to characterize the syndrome of the problem. The signatures may be annotated with the syndrome and a fix for the problem to diagnose and fix similar problems that may occur in the future for the same computer resource or for diagnosing a problem of another computer resource.

Table 3 below depicts examples of cluster centroids for four of the clusters from table 2. The cluster centroids in this example include a subset of the metrics in a signature. In other embodiments, the clusters may be represented using all the metrics in a signature. The four clusters are for clusters 1 and 3, which contained mostly violation signatures, and clusters 4 and 7, which contained mostly compliance signatures.

TABLE 3

| Metric Name | Cluster 1 | Cluster 3 | Cluster 4 | Cluster 7 |
|---|---|---|---|---|
| gbl cpu total_util | −1 | 1 | −1 | −1 |
| gbl app alive proc | 0 | 1 | 0 | −1 |
| gbl app active proc | 0 | 1 | 1 | −1 |
| gbl app run queue | −1 | 0 | −1 | −1 |
| gbl app net in packet rate | 0 | 0 | −1 | 1 |
| gbl mem util | 0 | 0 | −1 | −1 |
| gbl mem sys util | 0 | 0 | −1 | −1 |
| dbl cpu busy | 1 | 1 | −1 | −1 |

The centroids for clusters 4 and 7 corresponding to groups of compliance signatures deem most metrics as not attributed to a violation state, such as metrics with values of −1, while the centroids for clusters 1 and 3 corresponding to groups of violation signatures deem some of the metrics as attributed to a violation state, such as metrics with a value of 1, and others as either irrelevant, value of 0, or non-attributed, value of −1. In certain instances, based on cluster centroids, an administrator may identify irrelevant metrics and modify the data collection process, such as performed by the performance monitor 104, to eliminate these metrics. However, the elimination of these metrics may be problematic if future violations would have identified these metrics as attributed.

The difference between the centroids of the violation clusters 1 and 3 with respect to the metrics that are deemed attributed should be noted. For example, the centroid of cluster 1 has the database tier CPU utilization (db1 cpu busy) as attributed but assigned a −1 value for the application server CPU utilization (gb1 cpu total util). In contrast, the centroid of cluster 3 has the application server CPU as attributed, together with the number of alive processes and active processes on the application server. These differences point out the differences in symptoms of problems represented by the members in each cluster and are included in the syndromes. The centroids may thus be useful when determining the cause of a violation and distinguishing between different causes of a violation.

The syndrome of the problem may also be used as a label for signatures in a cluster. For example, signatures closest to a cluster may be given a centroid as a label, and the label is used to determine purity. The centroid may be determined from the mean or medium of the cluster.

In addition to determining a syndrome of a problem, the system 100 is operable to identify a recurrent problem from signatures determined by the signature creation engine 106. The recurrent problem determination module 132 is operable to identify recurrent problems from signatures, such as signatures stored in database 112. In one embodiment, the recurrent problem determination module 132 identifies signatures occurring during violation of an SLO and determines whether the signatures belong to a single group of signatures determined by the similarity determination module 130, such as a single cluster, or different groups. The recurrent problem determination module 132 may determine that a recurrent problem exists if the signatures belong to a single group. The time of occurrence of a signature may be determined from the time the metrics for the signature were measured or otherwise captured.

Figure 2:
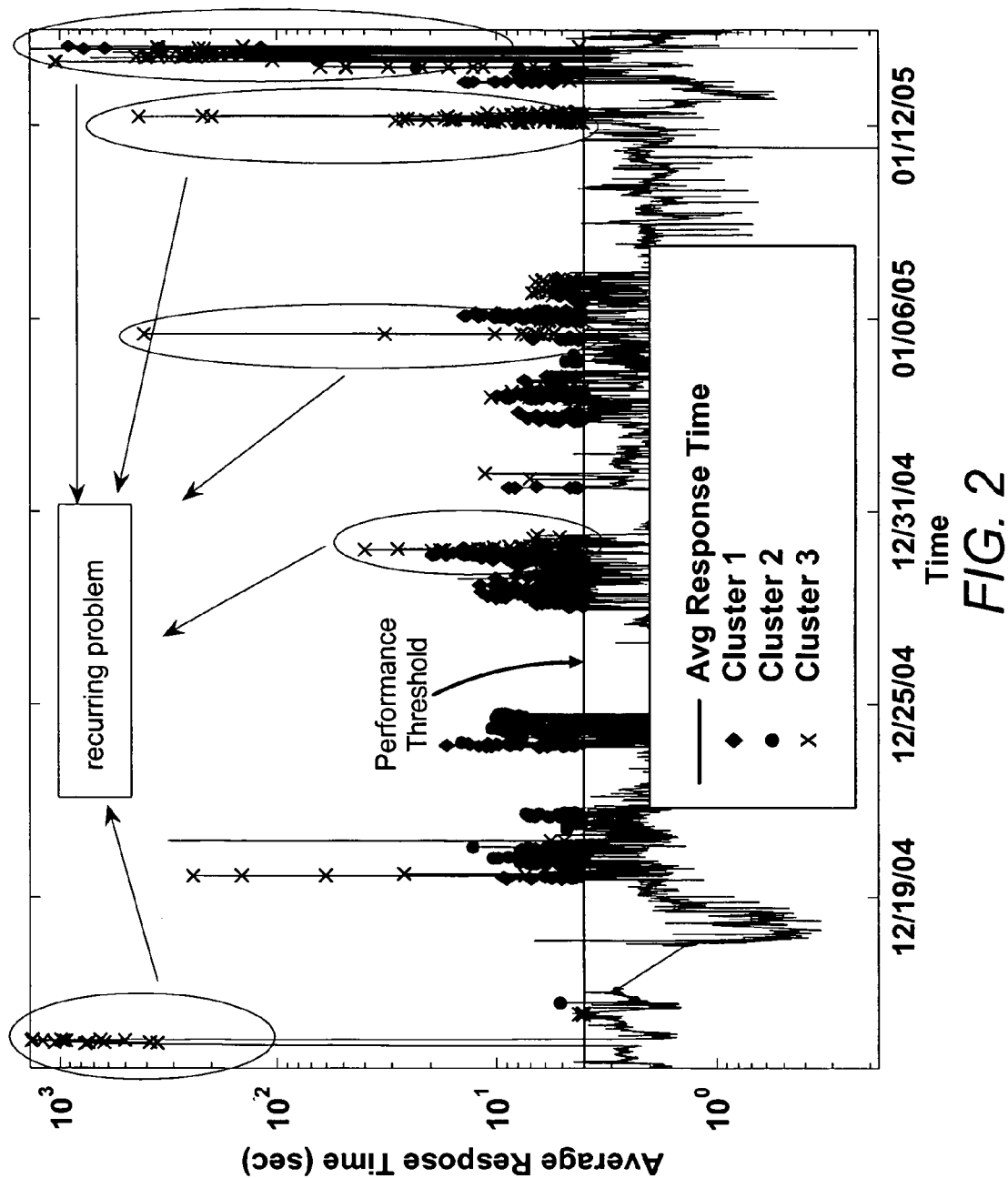
FIG. 2 shows signatures in clusters overlaid on a reference metric, according to an embodiment.

FIG. 2 illustrates signatures for clusters 1, 2 and 3 from table 2 overlaid on the reference metric average response time. For example, the average response time SLO threshold is represented by the dashed line in FIG. 2. As shown in FIG. 2, a simple graph plotting the signatures from different clusters may be used to quickly identify recurrent problems. For example, five circled violations of the average response time SLO are shown. Signatures from cluster 3 occur at the time of the violations. Thus, the signatures of cluster 3 are representative of a recurrent problem. Similarly, the signatures of clusters 2 and 3 may also be considered representative of a recurrent problem, but each cluster centroid may specify different symptoms. For example, cluster 1 has symptoms of higher database CPU utilization, such as an average of approximately 60% compared to approximately 20% in most other times, while at the same time all application server utilization metrics were not attributed, and were in fact normal. Cluster 2 has memory and disk utilization metrics as attributed to the violation.

The recurrent problem determination module 132 is operable to identify recurrent problems from the graph shown in FIG. 2, for example, by determining whether signatures occurring during the violations are from the same cluster. An administrator may also look at the time of occurrence of the signatures in each cluster to identify recurrent problems.

The system 100 or an administrator reviewing data determined from the system 100 is also operable to prioritize problems. For example, recurrent problems are given a higher priority and resources for fixing problems are devoted to those problems first. Priority may be based on one or more factors, such as the frequency of occurrence of a problem and whether the same or similar problem is occurring in more than one computer resource.

Signatures and clustering may also be used to diagnose problems on different computer resources. For example, a data center in America may be exhibiting problems. Signatures are determined and annotated with the problems. The signatures are clustered, for example, resulting in cluster 3. The signatures of cluster 3 are further annotated with the fix to the problem, for example, as determined by an administrator. An administrator for a data center in Asia is having problems. Signatures are determined. A determined signature annotated with the problem in the Asia data center is used to search the database 112. A signature in the cluster 3 is returned as a result of the search and is annotated with the fix to the problem, which may be applied by the administrator for the data center in Asia.

It should be noted that the three types of signatures described above, such as raw values, metric attribution, and raw values AND metric attribution, may be used for clustering. However, the metric attribution signatures yielded the most accurate search results when used to search and retrieve similar signatures from the database. Also, the metric attribution signatures generated the purest clusters.

Figure 3:
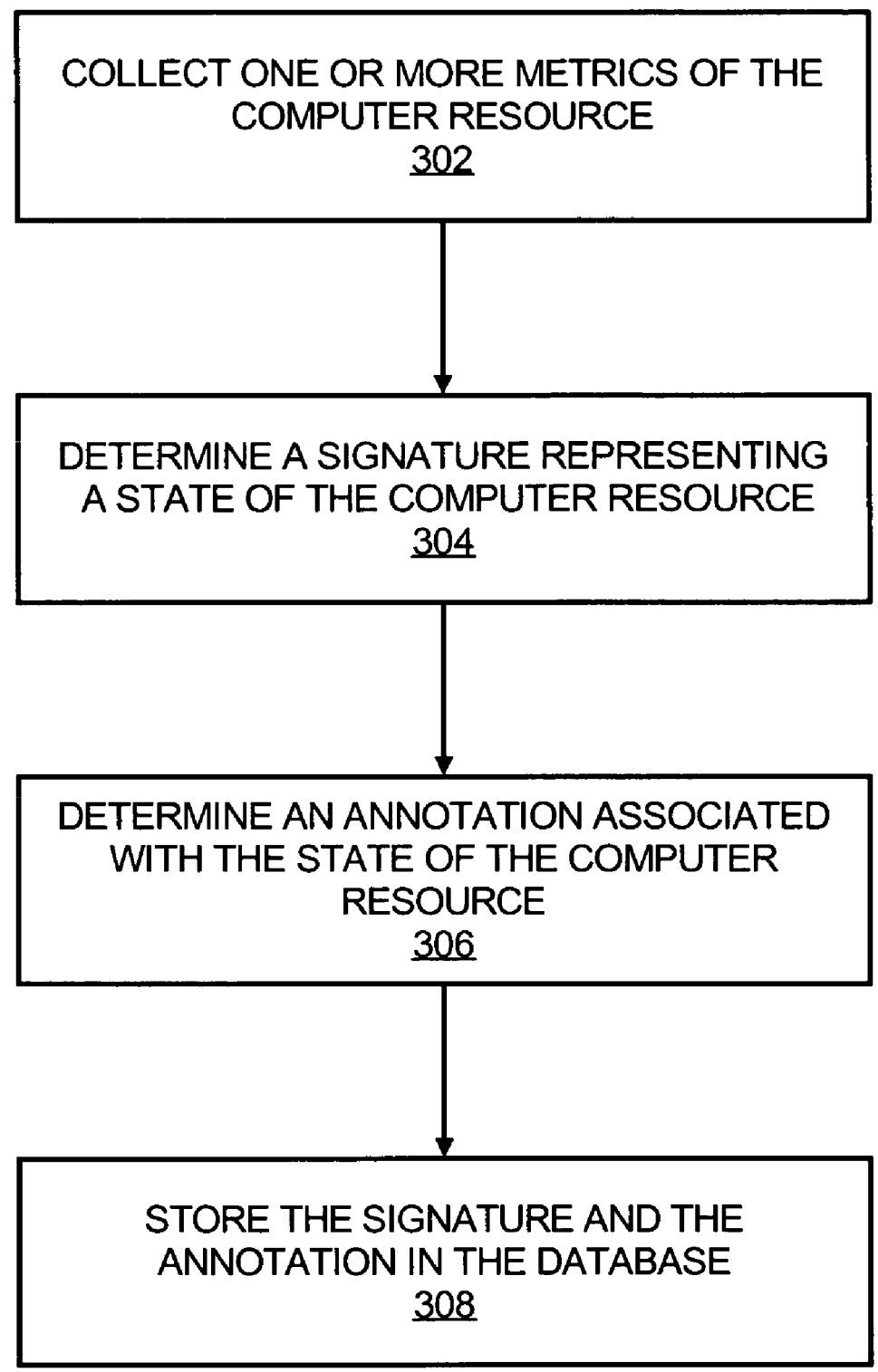
FIG. 3 shows a flow diagram of a method for creating a signature database, according to an embodiment.
Figure 4:
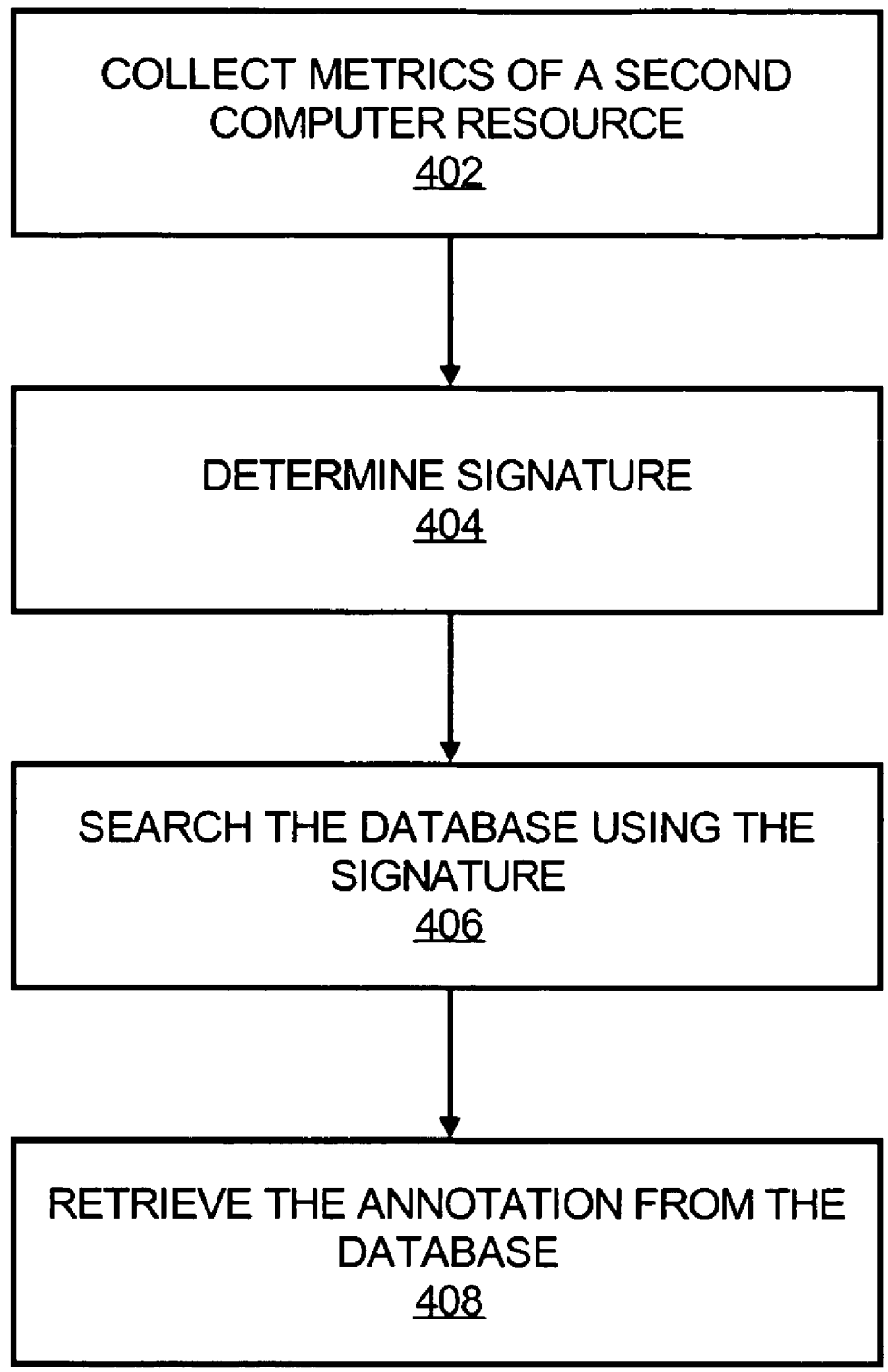
FIG. 4 shows a flow diagram of a method for searching a signature database, according to an embodiment.

FIGS. 3 and 4 show flow diagrams of methods 300 and 400, respectively. The following description of the methods 300 and 400 are made with reference to the system 100 illustrated in FIG. 1, and thus makes reference to the elements cited therein. The methods 300 and 400 are described with respect to the system 100 by way of example and not limitation.

According to an embodiment, in the method 300, at step 302 one or more metrics for a computer resource are collected. For example, the signature creation engine 106 receives metrics measured for the computer resource 102 by the performance monitor 104. The metrics, for example, are measured values or values calculated from measured values, such as a mean of values for metric measured during a time interval using the performance monitor 104. At step 304, the signature creation engine 106 determines a signature representing a state of the computer resource 102 from the metrics. Examples of signatures may include raw values, metric attribution, and raw value AND metric attribution vectors. At step 306, a user or an automated system determines an annotation associated with the at least one state of the computer resource. For example, the annotation may describe the problem, such as symptoms determined from the signature, and/or a fix to the problem. This annotation is received by the database interface 110. For example, the user inputs the annotation through the interface 108. The database interface 110 stores the signature and the annotation in the database 112 at step 308.

According to an embodiment, in the method 400, at step 402 one or more metrics for a second computer resource, such as the computer resource 102, are collected. This may include receiving metrics, measuring the metrics, and/or using measured values to calculate other values, such as a mean, as metrics. At step 404, the signature creation engine 106 determines a signature from the one or more metrics. The signature is a search signature used to search the database 112. Steps 304, 306, and/or 308 may be performed to determine the search signature. At step 406, the database interface 110 searches the database 112 using the search signature. At step 408, one or more signatures closely matching the search signature are identified from the database and the annotations corresponding to the closely matching signatures are retrieved possibly along with the signatures. These annotations may be used to diagnose and determine solutions for a problem for the second computer resource 116. One signature or multiple signatures closely matching the search signature may be identified at step 406. Thus, the system 100 allows a system administrator facing a current problem to efficiently leverage past problem diagnosis and solutions to diagnose and fix a current problem. The diagnosis may include a syndrome of a problem, such as determined by the syndrome determination module 134. The problem may include a recurrent problem, such as identified by the recurrent problem determination module 132.

Figure 5:
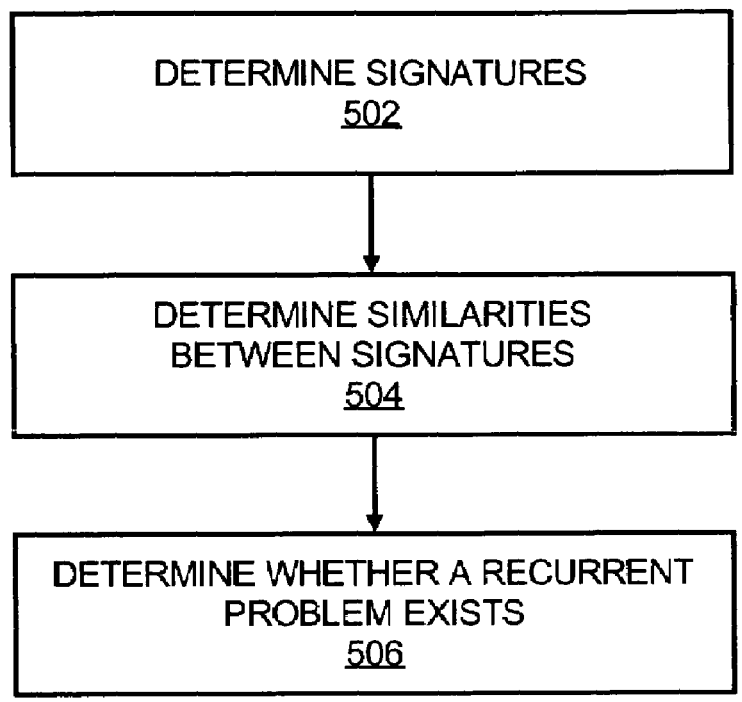
FIG. 5 shows a flow diagram of a method for determining whether a recurrent problem exists, according to an embodiment.

FIG. 5 illustrates a method 500 for identifying a recurrent problem of at least one computer resource, according to an embodiment. The at least one computer resource may include a single computer resource or multiple different computer resources that may be located in different geographic areas. The following description of the method 500 is made with reference to the system 100 illustrated in FIG. 1, and thus makes reference to the elements cited therein. The method 500 is described with respect to the system 100 by way of example and not limitation.

At step 502, the system 100 determines signatures. Steps 304, 306, and/or 308 may be performed to determine the signatures. Examples of signatures includes raw values, metric attribution and a combination of raw values and metric attribution.

At step 504, the system 100 determines similarities between the signatures. A pattern matching technique may be applied to determine similarities between signatures. In one embodiment, the pattern matching technique includes grouping signatures. One example of grouping signatures includes applying the clustering algorithm described above and with respect to FIG. 7. Determining similarities, which may include grouping signatures based on their similarities, may be determined automatically, for example, by the similarity determination module 130.

At step 506, the system 100 determines a recurrent problem of a computer resource exists based on at least some of the similarities. For example, the recurrent problem determination module 132 determines the time of occurrence of signatures in the database 112 and identifies signatures that occurred during SLO violations. If the signatures are in the same group, such as determined from at least some of the similarities determined at step 504, then a recurrent problem may exist. Also, if the signatures that occurred during the SLO violations are in the same cluster, the cluster may be evaluated to determine whether the cluster is representative of a SLO violation. For example, the purity of the cluster may be compared to a threshold.

Figure 6:
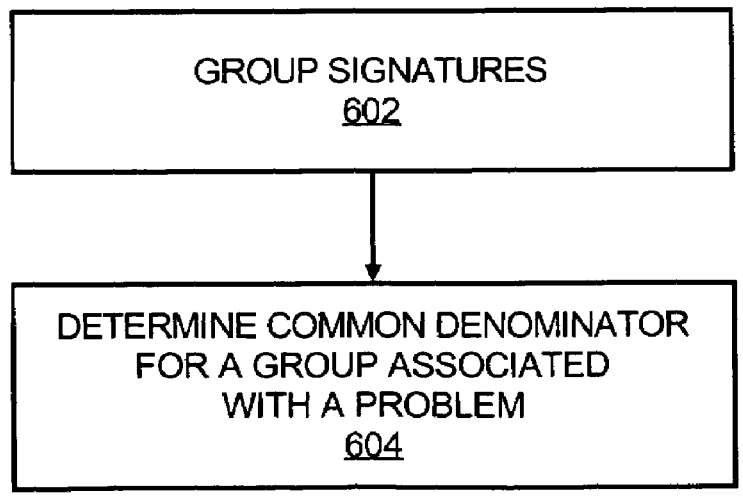
FIG. 6 shows a flow diagram of a method for determining a syndrome of a problem, according to an embodiment.

FIG. 6 illustrates a method 600 for identifying a syndrome of a problem of at least one computer resource, according to an embodiment. The following description of the method 600 is made with reference to the system 100 illustrated in FIG. 1, and thus makes reference to the elements cited therein. The method 600 is described with respect to the system 100 by way of example and not limitation.

At step 602, the system 100 groups signatures based on similarities. For example, the similarity determination module 130 groups signatures. Signatures stored in the database 112 may include a group identifier identifying the group the signature belongs to, which may be determined by the similarity determination module 130. One example of grouping includes applying the clustering algorithm described above and with respect to FIG. 7.

At step 604, the system 100 determines a common denominator that characterizes a group of signatures associated with a problem. The common denominator represents a syndrome of a problem. For example, some of the groups may include a majority of signatures representing a normal operating regime of a computer resource. Other groups may include a majority of signatures representing a problem of a computer resource. The syndrome determination module 134 determines syndromes for the groups representing problems. One example of determining a syndrome includes determining a syndrome from a cluster centroid. Another example includes identifying a substring or a largest substring that has the highest frequency of occurrence in a group of signatures. In this example, the signatures may include a string of characters and a substring includes a subset of the characters, which may be consecutive.

Figure 7:
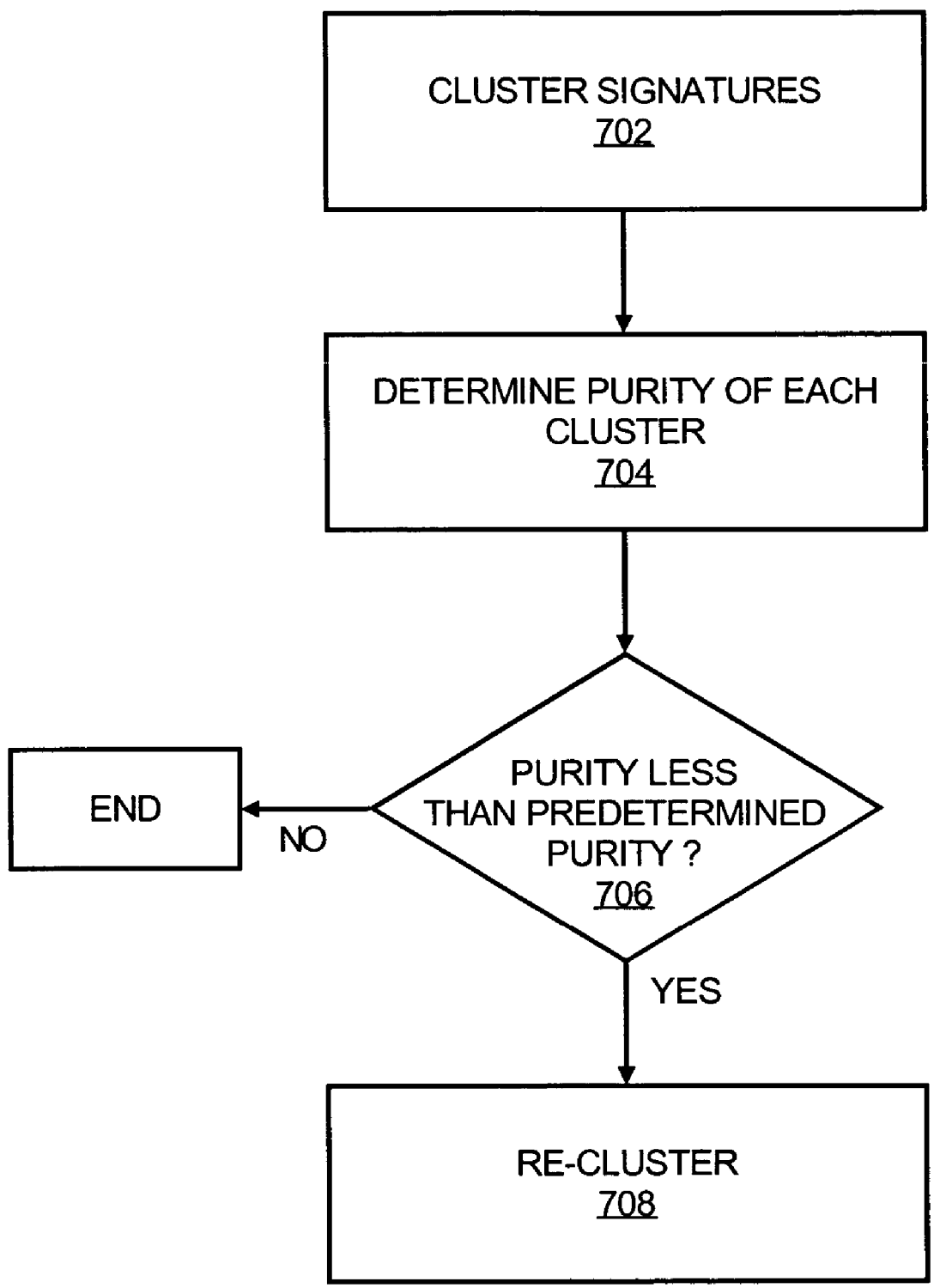
FIG. 7 shows a flow diagram of a method for clustering signatures, according to an embodiment.

FIG. 7 illustrates a method 700 for clustering signatures according to an embodiment. The following description of the method 700 is made with reference to the system 100 illustrated in FIG. 1, and thus makes reference to the elements cited therein. The method 700 is described with respect to the system 100 by way of example and not limitation.

At step 702, the clustering module 130 clusters signatures using a clustering algorithm, such as k-means or k-medians clustering algorithm. Other types of clustering algorithms may be used. The clustering algorithm, for example, is applied to the signatures stored in the database 112 to yield "k" clusters.

At step 704, the clustering module 130 determines the purity of each cluster. For example, the entropy is determined for each cluster, such as shown in table 2. Other examples of determining purity may include determining a count of similar signatures in each cluster, such as signatures representing the same state which may include a compliance state or violation state for a service level objective.

At step 706, the clustering module 130 compares the purity for each cluster to a threshold to determine whether the purity of any of the clusters is less than a predetermined purity. For example, for each cluster, if the purity is below a threshold, then the signatures in a cluster having a purity less than a predetermined purity are re-clustered at step 707, such as by repeating steps 702 and 704 for that cluster. For example, if the entropy for a cluster is determined to be greater than a threshold, then that cluster is marked for re-clustering. For example, the clustering algorithm used at step 702 is applied to the signatures in that cluster and the purity of the resulting "k" clusters is compared to a threshold. The steps 702 and 704 may be repeated for clusters found to have a purity below a predetermined purity, for example, until a predetermined maximum number of clusters have been created. Thus, the purity may be used as a stopping criteria for clustering.

At least some of the steps illustrated in the methods 300-700 and other steps described herein may be contained as a utility, program, subprogram, in any desired computer accessible medium. In addition, at least some of the steps illustrated in the methods 300-700 and other steps described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

Figure 8:
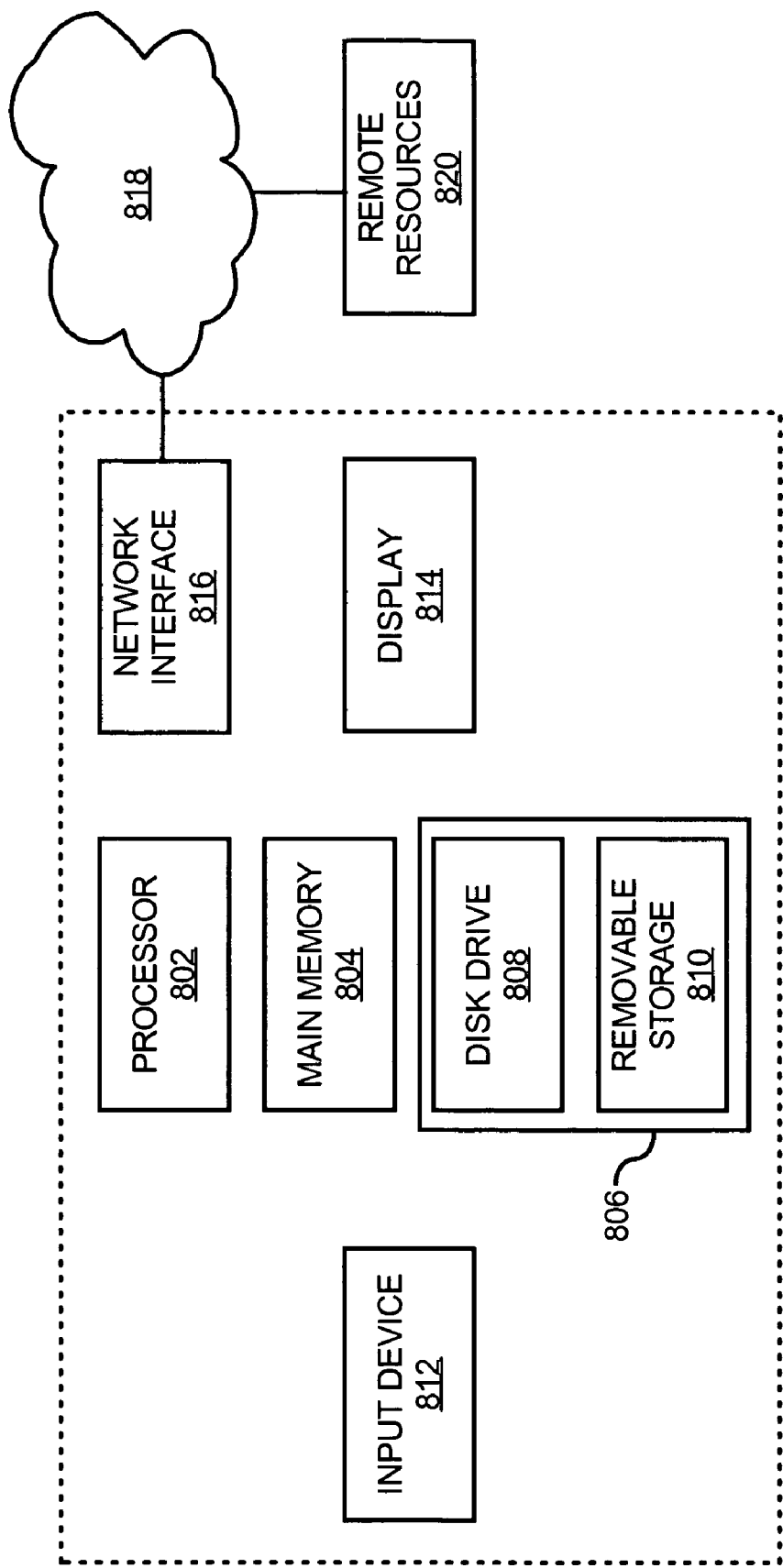
FIG. 8 shows a schematic diagram of a computer system in which one or more of the embodiments may be implemented.

FIG. 8 illustrates an exemplary block diagram of a computer system 800 that includes one or more processors, such as processor 802, providing an execution platform for executing software, for example, including at least some of the steps illustrated in the methods 300-600 and other steps described herein. The processor 802 may also execute an operating system (not shown) for executing the software in addition to performing operating system tasks.

The computer system 800 also includes a main memory 804, such as a Random Access Memory (RAM), where software may be resident during runtime, and mass storage 808. The mass storage 806 may include a hard disk drive 808 and/or a removable storage drive 810, representing a floppy diskette drive, a magnetic tape drive, a compact disk drive, or a nonvolatile memory where a copy of software or data may be stored. Applications and resources may be stored in the mass memory 806 and transferred to the main memory 804 during run time. The mass memory 806 may also include ROM (read only memory), EPROM (erasable, programmable ROM), EEPROM (electrically erasable, programmable ROM).

A user interfaces with the computer system 800 with one or more input devices 812, such as a keyboard, a mouse, a stylus, or any other input device and views results through a display 814. A network interface 816 is provided for communicating through a network 818 with remote resources 820. The remote resources 820 may include servers, remote storage devices, data warehouses, or any other remote device capable of interacting with the computer system 800.

What has been described and illustrated herein are examples of the systems and methods described herein along with some of their variations. The terms, descriptions and figures used herein are set forth by way of illustration only and are not meant as limitations. Those skilled in the art will recognize that many variations are possible within the spirit and scope of these examples, which intended to be defined by the following claims and their equivalents in which all terms are meant in their broadest reasonable sense unless otherwise indicated.

What is claimed is:

1. A method of determining a recurrent problem of at least one computer resource, the method comprising:
   determining signatures for at least one computer resource, each signature representing a state of the at least one computer resource;
   storing annotations with the signatures, the annotations including descriptions of a service level objective violation and a solution for fixing the violation;
   automatically determining similarities between the signatures;
   determining whether a recurrent problem of the at least one computer resource exists based on at least some of the similarities.

2. The method of claim 1, wherein automatically determining similarities between the signatures further comprises:
   determining groups of similar signatures.

3. The method of claim 1, further comprising:
   prioritizing problems of the at least one computer resource based on at least one of a frequency of occurrence of the problems and whether a problem has occurred in one computer resource or multiple computer resources.

4. The method of claim 1, wherein the at least one computer resource comprises different computer systems operable to be located in different geographic areas.

5. The method of claim 1, wherein the recurrent problem comprises a performance problem.

6. The method of claim 1, wherein determining the signatures further comprises:
   determining the signatures using at least one of raw values, metric attribution, and a combination of raw values and metric attribution.

7. The method of claim 1, further comprising:
   collecting a plurality of metrics for the at least one computer resource; and
   determining the signatures using metric attribution of the plurality of metrics, wherein the metric attribution includes determining whether a metric of the plurality of metrics is attributed to a service level objective violation.

8. A method of determining a recurrent problem of at least one computer resource, the method comprising:
   determining signatures for at least one computer resource, each signature representing a state of the at least one computer resource;
   automatically determining similarities between the signatures by determining groups of similar signatures;
   determining whether a recurrent problem of the at least one computer resource exists based on at least some of the similarities and by
      determining a time of occurrence of the signatures in each group; and
      identifying signatures in the same group having metrics captured during service level objective violations for the at least one computer resource.

9. The method of claim 8, wherein the groups are clusters determined using a clustering algorithm and the method further comprises:
   evaluating a purity of a cluster having the identified signatures and a similarity between signatures in the cluster.

10. The method of claim 9, further comprising:
    identifying labels for the signatures in the cluster; and
    determining the purity of the cluster based on similarities between the labels of the signatures in the cluster.

11. The method of claim 8, further comprising:
    determining whether the recurrent problem comprises at least two different problems or a single recurrent problem based on whether signatures having metrics captured during the service level objective violations are included in a same group or in different groups.

12. A method of determining a recurrent problem of at least one computer resource, the method comprising:
    determining signatures for at least one computer resource, each signature representing a state of the at least one computer resource;
    automatically determining similarities between the signatures by determining groups of similar signatures, wherein the determining of groups of similar signatures includes
       determining clusters of signatures;
       determining a purity of each cluster;
       determining whether the purity of any of the clusters is less than a predetermined purity; and
       for each cluster determined to have a purity less than the predetermined purity, determining new clusters for signatures from the cluster; and
    determining whether a recurrent problem of the at least one computer resource exists based on at least some of the similarities.

13. The method of claim 12, further comprising:
    determining a label for each of the signatures, wherein the label is representative of a state of a computer resource; and
    identifying signatures having a same label in each cluster to determine the purity of each cluster.

14. The method of claim 12, wherein determining the purity based on the similarity further comprises:
    determining an entropy for each cluster, wherein the entropy is based on probability estimates that signatures in a cluster refer to the same label.

15. The method of claim 14, wherein the label for each signature represents a violation of a service level objective or represents a compliance with the service level objective.

16. The method of claim 14, wherein the label for a signature in a cluster of the clusters is based on a centroid of the cluster.

17. The method of claim 16, wherein the centroid is associated with a mean of the cluster or a median of the cluster.

18. The method of claim 14, further comprising:
providing the label for each signature in an annotation for each signature.

19. The method of claim 12 wherein new clusters are determined until purity is at least as pure as the predetermined purity for all the clusters or until a total number of clusters exceeds a threshold.

20. The method of claim 12, wherein the purity for each cluster is a metric indicating the homogeneity of labels for signatures in a respective cluster and the method further comprises:
evaluating whether a cluster is representative of a single state of a computer resource based on the purity.

21. The method of claim 12, wherein determining clusters of signatures comprises:
using a distance metric to determine similarities between the signatures and to assign the signatures to clusters.

22. A method of determining a syndrome of a computer resource problem, the method comprising:
grouping signatures of at least one computer resource based on similarities, wherein the signatures represent states of the at least one computer resource;
annotating signatures in a group with the syndrome of the problem of the at least one computer resource, wherein the annotating of signatures includes
generating a label corresponding to the syndrome of the problem of the at least one computer resource; and
annotating the signatures in the group with the label; and
for at least one of the groups, determining a common denominator that characterizes the signatures in the group, wherein the common denominator is representative of a syndrome of a problem of the at least one computer resource.

23. The method of claim 22, wherein grouping signatures of at least one computer resource based on similarities further comprises:
determining clusters of the signatures based on similarities of the signatures.

24. The method of claim 22, wherein determining a common denominator further comprises:
determining a centroid for each cluster including signatures associated with a problem of the at least one computer resource.

25. The method of claim 22, wherein determining a common denominator further comprises:
determining a most frequently occurring substring in the signatures in each cluster including signatures associated with a problem of the at least one computer resource.

26. The method of claim 22, wherein determining a common denominator further comprises:
determining a largest, most frequently occurring substring in the signatures in each group.

27. The method of claim 22, further comprising:
using at least one signature annotated with the syndrome of the problem of the at least one computer resource to diagnose a problem with another computer resource having a signature similar to the at least one annotated signature.

28. A computer system comprising:
a signature creation engine operable to determine signatures representing states of at least one computer resource from metrics for the at least one computer resource;
a recurrent problem identifier module operable to identify a recurrent problem of the at least one computer resource from the signatures; and
a database operable to store the signatures on a tangible computer readable storage medium along with an annotation for each signature including information relating to a state of the at least one computer resource, wherein the annotations include labels corresponding to a syndrome of a problem of the at least one computer resource and signatures included in a same group based on similarities have annotations with a same label.

29. The computer system of claim 28, further comprising:
a common denominator module operable to determine a syndrome of a problem of the at least one computer resource from the signatures.

30. The computer system of claim 28, wherein the annotations include at least one of a diagnosis of a problem, a solution to the problem, configuration of a system, identification of a system administrator, a label identifying a problem associated with the signature, and a purity of a cluster including the signature.

31. The computer system of claim 28, further comprising:
an interface operable to allow a user to annotate the signatures with the annotations.

32. The computer system of claim 28, wherein the database is searchable to identify at least one signature closely matching a signature for another computer resource used to search the database and is operable to retrieve each closely matching signature and information annotated for each closely matching signature to diagnose a problem for the another computer resource.

33. A method comprising:
receiving a search signature including a signature for a first computer system having a problem; and
searching clusters of stored signatures for at least one signature similar to the search signature, wherein the signatures are clustered to group similar signatures and each signature includes an annotation including a description of a state of a computer system associated with the signature,
wherein the annotations include labels corresponding to a syndrome of a problem of a computer system and signatures included in a same group based on similarities have annotations with a same label; and
retrieving the annotation for at least one of the similar signatures.

34. The method of claim 33, wherein searching clusters of stored signatures further comprises:
determining similarities between the search signature and at least one signature or a centroid of each cluster.

35. The method of claim 33, further comprising:
at least one of diagnosing the problem of the first computer and determining a solution to the problem using the retrieved annotation.

36. The method of claim 33, wherein the stored signatures comprise signatures associated with at least one other computer system different from the first computer system.

37. An apparatus comprising:
means for determining signatures representing states of at least one computer resource;
means for storing the signatures and an annotation for each signature including information associated with a state of the at least one computer resource,
wherein the annotations include labels corresponding to a syndrome of a problem of a computer resource and signatures included in a same group based on similarities have annotations with a same label;
means for determining a recurrent problem of the at least one computer resource from at least some of the signatures;

means for determining a syndrome of a problem of the at least one computer resource from at least some of the signatures; and means for searching the stored signatures to identify at least one closely matching signature of a signature of another computer resource to at least one of diagnose and determine a solution of a problem of the another computer resource.

* * * * *

UNITED STATES PATENT AND TRADEMARK OFFICE
CERTIFICATE OF CORRECTION

PATENT NO. : 7,502,971 B2  Page 1 of 1
APPLICATION NO. : 11/248692
DATED : March 10, 2009
INVENTOR(S) : Ira Cohen et al.

It is certified that error appears in the above-identified patent and that said Letters Patent is hereby corrected as shown below:

In column 10, line 45, delete "db1" and insert -- dbl --, therefor.

In column 10, line 47, delete "gb1" and insert -- gbl --, therefor.

Signed and Sealed this

Sixth Day of April, 2010

David J. Kappos
*Director of the United States Patent and Trademark Office*